(12) United States Patent
Song et al.

(10) Patent No.: US 9,098,642 B2
(45) Date of Patent: **\*Aug. 4, 2015**

(54) DUAL BUS STANDARD SWITCHING BUS CONTROLLER

(71) Applicant: Intel Corporation, Santa Clara, CA (US)

(72) Inventors: Ting Lok Song, Bayan Lepas (MY); Su Wei Lim, Klang (MY); Mikal C. Hunsaker, El Dorado Hills, CA (US); Hooi Kar Loo, Bayan Lepas (MY)

(73) Assignee: Intel Corporation, Santa Clara, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/194,893

(22) Filed: Mar. 3, 2014

(65) Prior Publication Data

US 2014/0181356 A1 Jun. 26, 2014

Related U.S. Application Data

(63) Continuation of application No. 12/928,906, filed on Dec. 22, 2010, now Pat. No. 8,706,944.

(51) Int. Cl.
*G06F 13/20* (2006.01)
*G06F 13/28* (2006.01)
*G06F 13/40* (2006.01)
*G06F 13/38* (2006.01)

(52) U.S. Cl.
CPC .......... *G06F 13/4022* (2013.01); *G06F 13/385* (2013.01); *G06F 13/387* (2013.01)

(58) Field of Classification Search
USPC ............................ 710/306–317, 62–64, 8–19
See application file for complete search history.

(56) References Cited

U.S. PATENT DOCUMENTS

| 7,673,090 | B2 | 3/2010 | Kaushik et al. |
| 7,715,450 | B2 | 5/2010 | Ohara |
| 7,996,596 | B2 | 8/2011 | Sultenfuss et al. |
| 8,706,944 | B2 \* | 4/2014 | Song et al. ..................... 710/313 |

(Continued)

FOREIGN PATENT DOCUMENTS

| WO | 2012/087652 A2 | 6/2012 |
| WO | 2012/087652 A3 | 10/2012 |

OTHER PUBLICATIONS

International Preliminary Report on Patentability received for PCT Patent Application No. PCT/US2011/064541, mailed on Jul. 4, 2013, 6 pages.

(Continued)

*Primary Examiner* — Raymond Phan
(74) *Attorney, Agent, or Firm* — Jordan IP Law, LLC

(57) ABSTRACT

In some embodiments, an electronic system includes a processor, a memory in communication with the processor, a bus in communication with the processor, an Express Card controller coupled to the bus, the Express Card controller providing an interface to an external device, a USB3 controller coupled to the bus and in communication with the Express Card controller, and a PCIE controller coupled to the bus and in communication with the Express Card controller. The Express Card controller may be configured to determine whether the external device is a USB3 device or a PCIE device and to switch between the USB3 controller and the PCIE controller based on the state of a USB3 select pin strap. Other embodiments are disclosed and claimed.

20 Claims, 6 Drawing Sheets

(56) References Cited

U.S. PATENT DOCUMENTS

| | | |
|---|---|---|
| 2005/0138288 A1 | 6/2005 | Chou et al. |
| 2006/0174048 A1 | 8/2006 | Ohara et al. |
| 2007/0073959 A1 | 3/2007 | McAfee et al. |
| 2008/0168207 A1 | 7/2008 | Gregg |
| 2008/0228986 A1 | 9/2008 | Lodolo |
| 2009/0271557 A1 | 10/2009 | Hsu |
| 2010/0125689 A1 | 5/2010 | Chang et al. |
| 2011/0191503 A1 | 8/2011 | Kakish |
| 2012/0166691 A1 | 6/2012 | Song et al. |

OTHER PUBLICATIONS

International Search Report and Written Opinion received for PCT Patent Application No. PCT/US2011/064541, mailed on Jul. 27, 2012, 13 pages.

* cited by examiner

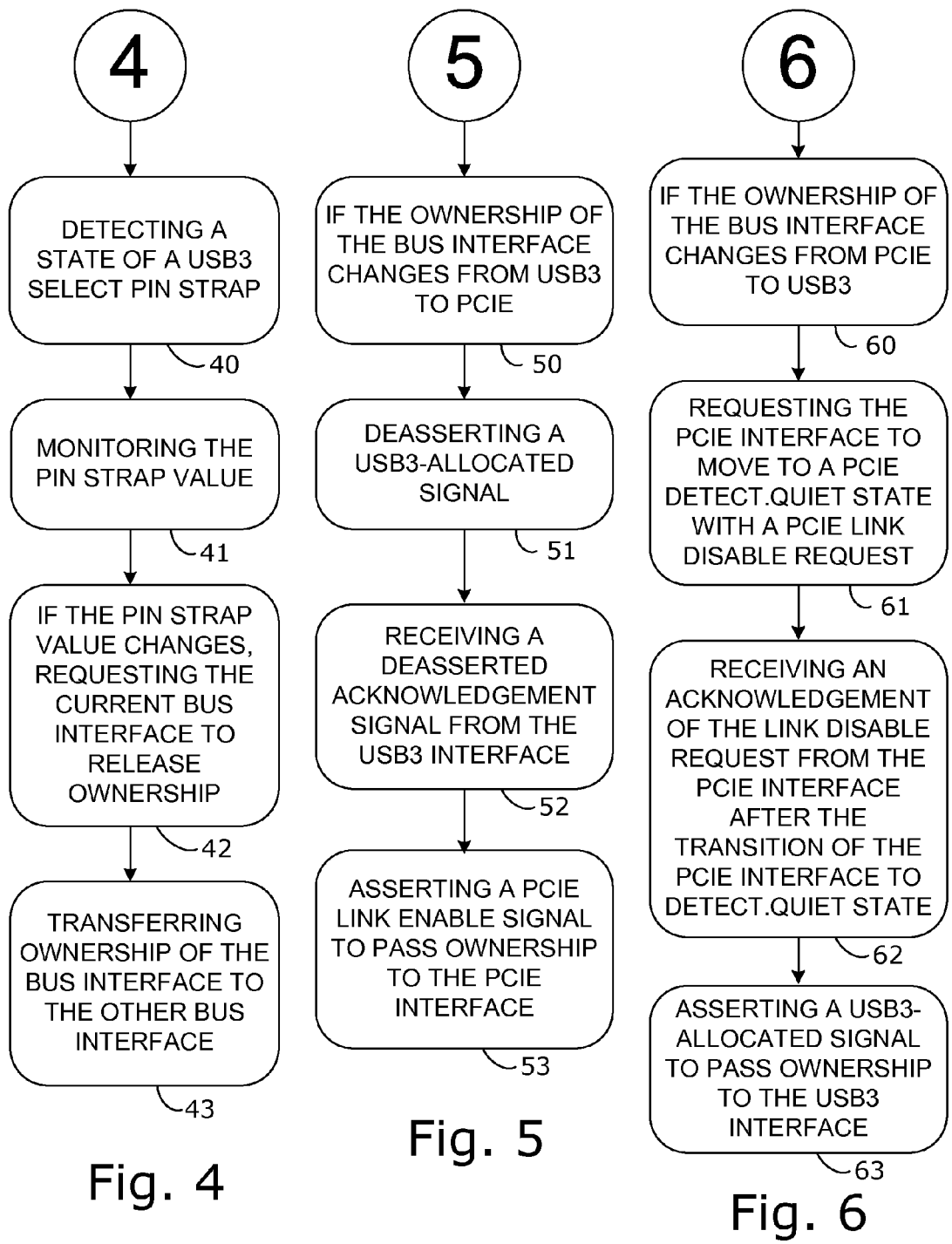

DUAL BUS STANDARD SWITCHING BUS CONTROLLER

CROSS-REFERENCE TO RELATED APPLICATIONS

This application is a continuation of U.S. patent application Ser. No. 12/928,906, filed Dec. 22, 2010.

TECHNICAL FIELD

The invention relates to bus controllers and more particularly to an Express Card controller with in-band dynamic switching between PCIE and USB3.

BACKGROUND AND RELATED ART

ExpressCard is an interface to allow peripheral devices to be connected to a computer. PCI Express (Peripheral Component Interconnect Express, hereinafter PCIE), is a computer expansion card standard. Universal Serial Bus (USB) is a specification to establish communication between devices and a host controller.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

FIG. 4 is another flow diagram in accordance with some embodiments of the invention.

FIG. 5 is another flow diagram in accordance with some embodiments of the invention.

FIG. 6 is another flow diagram in accordance with some embodiments of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
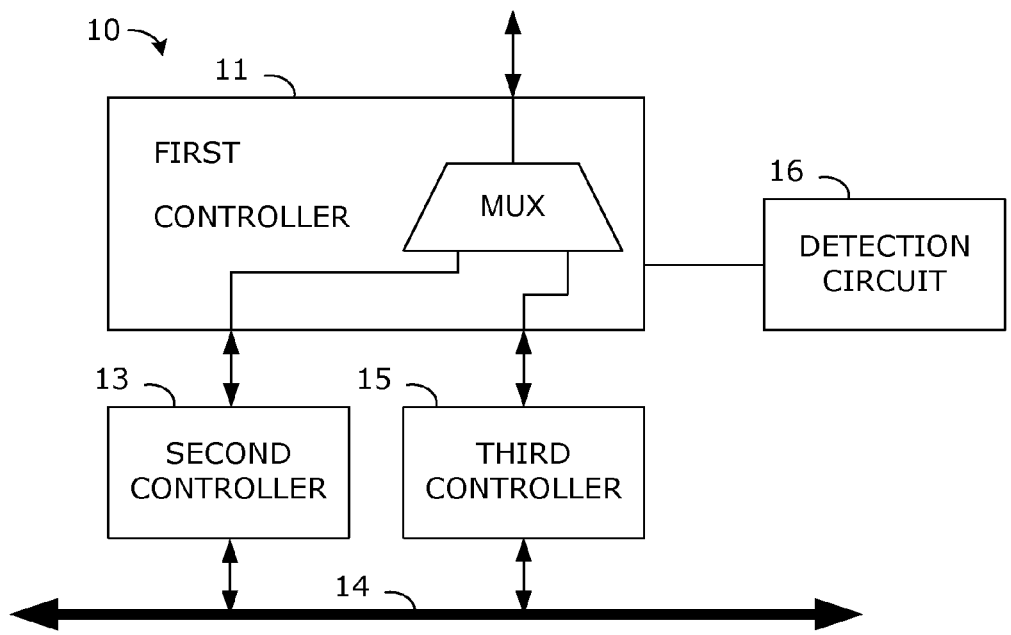
FIG. 1 is a block diagram of a bus controller in accordance with some embodiments of the invention.

With reference to FIG. 1, in accordance with some embodiments of the invention a bus controller 10 may include a first controller 11 providing an interface to an external device, a second controller 13 in communication with the first controller 11, the second controller 13 providing an interface to an internal bus 14 in accordance with a first bus standard, a third controller 15 in communication with the first controller 11, the third controller 15 providing an interface to an internal bus 14 in accordance with a second bus standard, and a detection circuit 16 in communication with the first controller 11. For example, the detection circuit 16 may be configured to detect whether the external device communicates in accordance with first bus standard or the second bus standard. For example, the first controller 11 may be configured to switch between the second and third controllers 13, 15 based on the information provided from the detection circuit 16.

For example, the first controller 11 may include a multiplexer (MUX) to select between signals received from the second and third controllers 13, 15. For example, the interface to the external device may include an external connector or port. For example, the detection circuit 16 may be connected to the external port and use a signal received from the external port to provide a selection signal to the MUX in the first controller 11.

In accordance with some embodiments of the invention, the first controller 11 may provide hot removal support for the external device to switch between the second and third controllers 13, 15 regardless of the first controller state while maintaining compliance to the respective first and second bus standards. For example, the first controller 11 may include an Express Card controller, the second controller 13 may include a Universal Serial Bus specification 3.0 (USB3) controller, and the third controller 15 may include Peripheral Component Interconnect Express (PCIE) controller.

In some embodiments of the invention, for example, the detection circuit 16 may include an Express Card strap controller connected to a USB3 select pin strap (e.g. on an Express Card 2.0 port). For example, the first controller 11 may be configured to monitor the pin strap value. If the pin strap value changes, the first controller 11 may request the current controller of the bus interface to release ownership, and the first controller 11 may then transfer ownership of the bus interface to the other controller.

For example, in some embodiments of the invention, if the ownership of the bus interface changes from USB3 to PCIE the Express Card controller 11 may be configured to deassert a USB3-allocated signal, receive a deasserted acknowledgement signal from the USB3 controller, and assert a PCIE link enable signal to pass ownership to the PCIE controller. If the ownership of the bus interface changes from PCIE to USB3 the Express Card controller 11 may be configured to request the PCIE controller to move to a PCIE Detect.Quiet state with a PCIE link disable request, receive an acknowledgement of the link disable request from the PCIE controller after the transition of the PCIE controller to DetectQuiet state, and assert a USB3-allocated signal to pass ownership to the USB3 controller.

Figure 2:
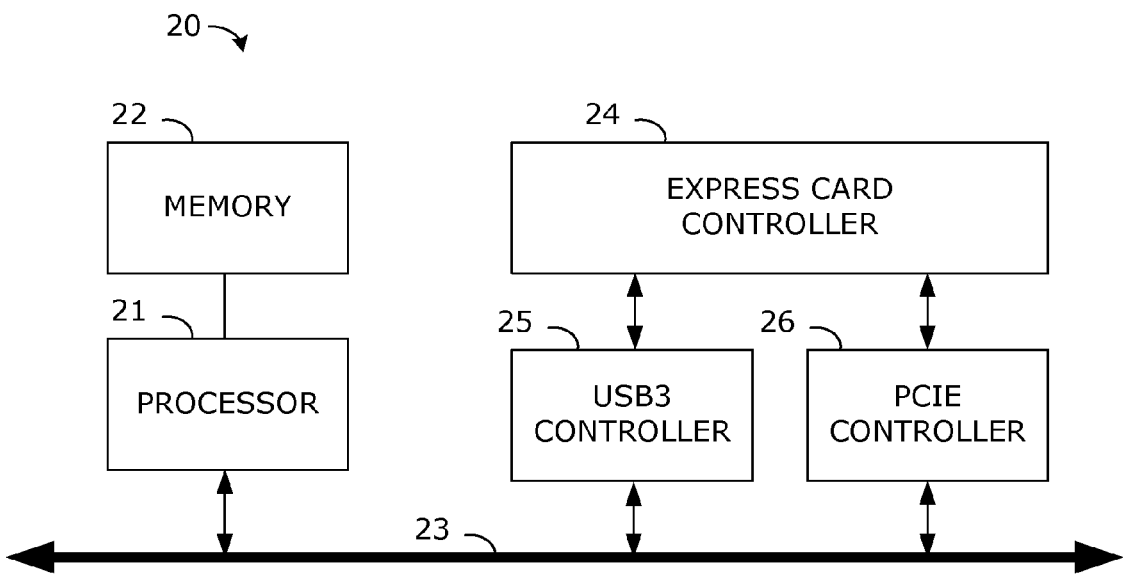
FIG. 2 is a block diagram of an electronic system in accordance with some embodiments of the invention.

With reference to FIG. 2, in accordance with some embodiments of the invention an electronic system 20 may include a processor 21, a memory 22 in communication with the processor 21, and a bus 23 in communication with the processor 21. The electronic system 20 may further include an Express Card controller 24 coupled to the bus 23, the Express Card controller 24 providing an interface to an external device, a USB3 controller 25 coupled to the bus 23 and in communication with the Express Card controller 24, and a PCIE controller 26 coupled to the bus 23 and in communication with the Express Card controller 24. For example, the interface to the external device may include and Express Card 2.0 port. For example, the Express Card controller 24 may be configured to determine whether the external device is a USB3 device or a PCIE device and to switch between the USB3 controller 25 and the PCIE controller 26 based on the state of a USB3 select pin strap.

For example, in accordance with some embodiments of the invention, the Express Card controller 24 may provide hot removal support for the external device to switch between the USB3 and PCIE controllers 25, 26 regardless of the Express Card controller state while maintaining compliance to respective USB3 and PCIE bus standards. For example, the Express Card controller 24 may be configured to monitor the pin strap value. If the pin strap value changes, the Express Card controller 24 may request the current controller of the bus interface to release ownership, and then the Express Card controller may transfer ownership of the bus interface to the other controller.

For example, if the ownership of the bus interface changes from USB3 to PCIE the Express Card controller 24 may be configured to deassert a USB3-allocated signal, receive a deasserted acknowledgement signal from the USB3 controller 25, and assert a PCIE link enable signal to pass ownership to the PCIE controller 26. For example, if the ownership of the bus interface changes from PCIE to USB3 the Express Card controller 24 may be configured to request the PCIE controller 26 to move to a PCIE Detect.Quiet state with a PCIE link disable request, receive an acknowledgement of the link disable request from the PCIE controller 26 after the transition of the PCIE controller 26 to DetectQuiet state, and assert a USB3-allocated signal to pass ownership to the USB3 controller 25.

FIG. 2 shows the USB3 controller 25, PCIE controller 26 and processor 21 connected to the same bus 23 for illustration purposes only. For example, the bus 23 may be an internal bus within a chipset component. In some systems the processor 21, USB3 controller 26, and/or PCIE controller 26 may be connected to one or more different internal buses (e.g. which may be in communication with each other through various bridge components). Externally, the USB3 and PCIE controllers 25, 26 may be multiplexed onto a single Express Card 2.0 port for connection to Express Card 2.0 devices.

Figure 3:
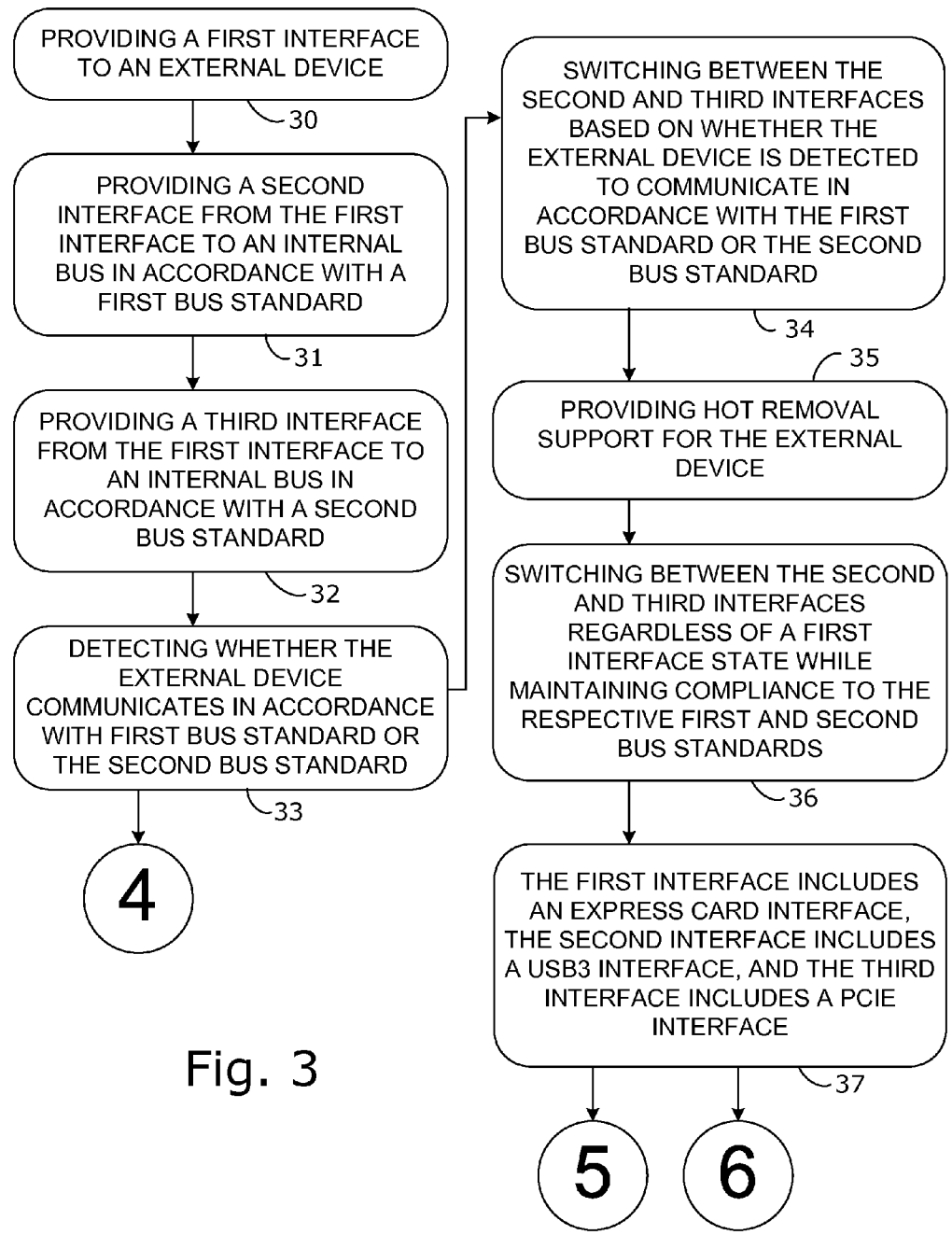
FIG. 3 is a flow diagram in accordance with some embodiments of the invention.

With reference to FIG. 3, in accordance with some embodiments of the invention, a method of operating a bus interface may include providing a first interface to an external device (e.g. at block 30), providing a second interface from the first interface to an internal bus in accordance with a first bus standard (e.g. at block 31), providing a third interface from the first interface to an internal bus in accordance with a second bus standard (e.g. at block 32), detecting whether the external device communicates in accordance with first bus standard or the second bus standard (e.g. at block 33), and switching between the second and third interfaces based on whether the external device is detected to communicate in accordance with the first bus standard or the second bus standard (e.g. at block 34).

For example, some embodiments of the invention may further include providing hot removal support for the external device (e.g. at block 35), and switching between the second and third interfaces regardless of a first interface state while maintaining compliance to the respective first and second bus standards (e.g. at block 36). For example, the first interface may include an Express Card interface, the second interface may include a USB3 interface, and the third interface may include a PCIE interface (e.g. at block 37).

With reference to FIG. 4, in some embodiments of the invention, detecting whether the external device communicates in accordance with the first bus standard or the second bus standard may include detecting a state of a USB3 select pin strap (e.g. at block 40). Some embodiments of the invention may further include monitoring the pin strap value (e.g. at block 41), if the pin strap value changes, requesting the current bus interface to release ownership (e.g. at block 42), transferring ownership of the bus interface to the other bus interface (e.g. at block 43).

With reference to FIG. 5, if the ownership of the bus interface changes from USB3 to PCIE (e.g. at block 50), some embodiments of the invention may further include deasserting a USB3-allocated signal (e.g. at block 51), receiving a deasserted acknowledgement signal from the USB3 interface (e.g. at block 52), and asserting a PCIE link enable signal to pass ownership to the PCIE interface (e.g. at block 53).

With reference to FIG. 6, if the ownership of the bus interface changes from PCIE to USB3 (e.g. at block 60), some embodiments of the invention may further include requesting the PCIE interface to move to a PCIE Detect.Quiet state with a PCIE link disable request (e.g. at block 61), receiving an acknowledgement of the link disable request from the PCIE interface after the transition of the PCIE interface to Detect.Quiet state (e.g. at block 62), and asserting a USB3-allocated signal to pass ownership to the USB3 interface (e.g. at block 63).

Advantageously, some embodiments of the invention may provide a method and apparatus for in-band dynamic switching between PCIE and USB3 connected to Express Card 2.0. For purposes of illustration and not limitation, the Express Card 2.0 specification may require the ability to support both PCIE and USB3 on the same x1 controller slot/lane. In some systems, the USB3 pins may be shared with the PCIE pins at the Express Card connector, where they may be multiplexed internally and routed to the connector as a single set of Transmit and Receive pins. Advantageously, some embodiments of the invention may solve the problem of being able to switch between the PCIE and USB3 controllers regardless of controller link states due to hot removal support while still maintaining compliance to the respective PCIE and USB3 specification. For example, some embodiments of the invention may provide a mechanism to detect whether the inserted express card contains a PCIE device or a USB3 device.

In some embodiments of the invention, dynamic switching between PCI Express and USB3 may be implemented via an ExpressCard USB3# select pin strap. For example, the USB3# input pin may be pulled low by a connected USB3 device. In accordance with some embodiments of the invention, if the ExpressCard USB3# strap signal is '0' when a device is detected, then that device may be presumed to be operating in USB3 Mode. Otherwise, the device may be presumed to be operating in PCI Express mode.

In some embodiments of the invention, an ExpressCard Strap controller may observe the USB3# select pin. For example, the ExpressCard Strap controller may function as a multiplex selector to the USB3 controller and PCIE controller. If the pin strap value changes, the ExpressCard Strap controller may issue a request to the present occupant of the bus to move to the RxDetect.Quiet state of the USB3 link state or the Detect.Quiet state of PCIE link state, respectively. When the present bus owner has completed this request, the present bus owner may give ownership of the link over to the ExpressCard Strap controller.

The ExpressCard strap controller may then change the interface mode and give control to the new controller selected by the USB3# select strap. The ExpressCard Strap controller may ensure that the interface is switched to its required power state corresponding to the receiver termination detection sequence. For example, the ExpressCard Strap controller may switch the operating signal/data rate to the correct setting prior to hand-over to the new controller.

Figure 7:
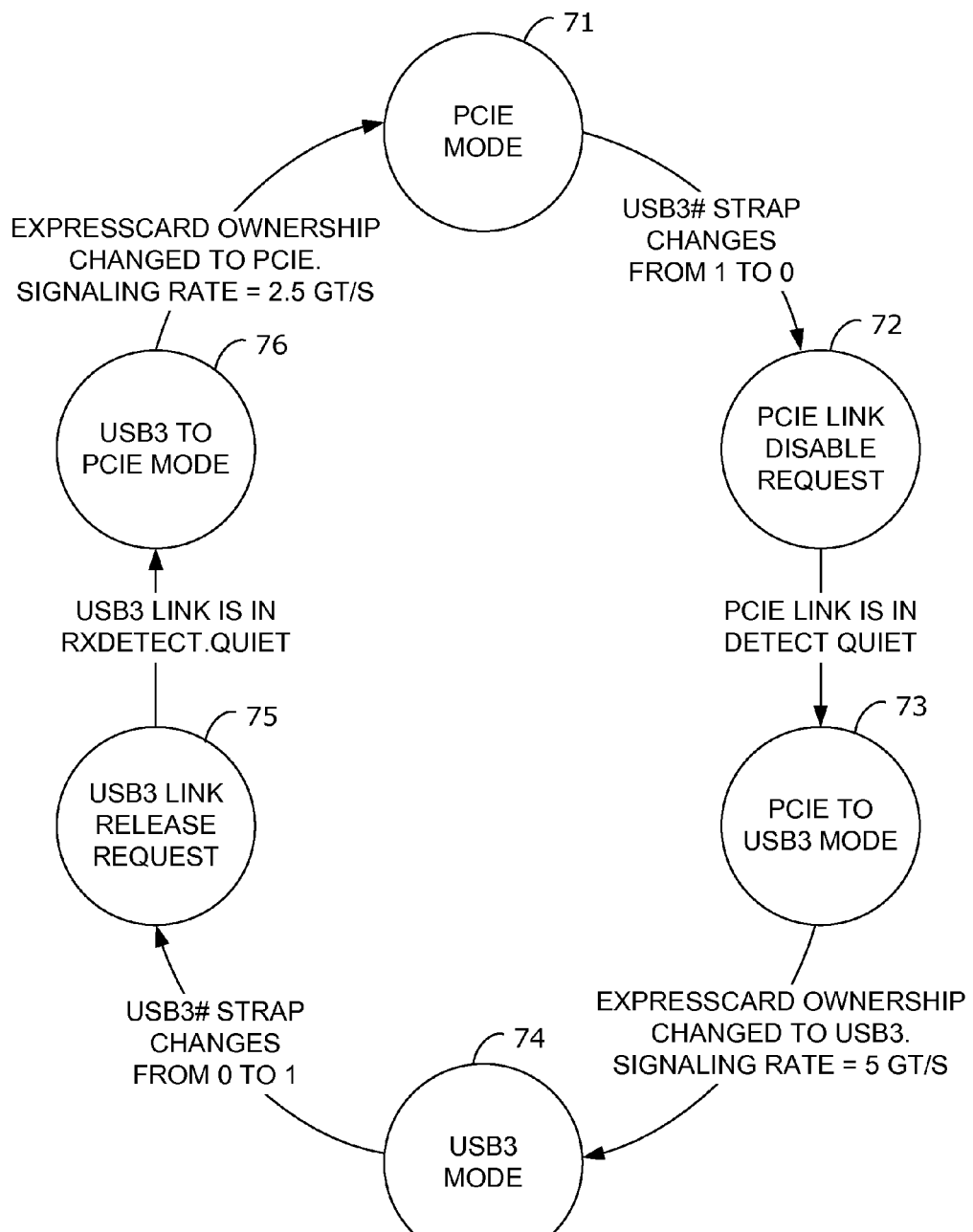
FIG. 7 is another flow diagram in accordance with some embodiments of the invention.

With reference to FIG. 7, some embodiments of the invention may involve a state machine for the ExpressCard Strap controller. For example, starting in PCIE mode (e.g. at block 71), switching to USB3 mode may involve the ExpressCard controller detecting the USB3# strap signal changing from '1' to '0'. The ExpressCard Strap controller may request the current PCIE controller to move back to the PCIE Detect. Quiet state via the PCIE link disable flow (e.g. at block 72, described in more detail in connection with FIG. 9). The PCIE controller will subsequently acknowledge the link disable request after completing transition to DetectQuiet state. The ExpressCard controller passes ownership to the USB3 controller by asserting the USB3-allocated signal (e.g. moving from PCIE mode to USB3 mode at block 73). The ExpressCard ownership may be changed to USB3 and the signaling rate may be changed, for example, to 5 GT/s. The USB3 controller acknowledges after claiming ownership and then operates in USB3 mode (e.g. at block 74).

Switching from USB3 to PCIE (e.g. starting from USB3 mode in block 74) may involve the ExpressCard controller detecting the USB3# strap signal changing from '0' to '1'. The ExpressCard Strap controller may then request the current USB3 controller to release ownership (e.g. by deasserting USB3-allocated signal at block 75). The USB3 controller may then transition to the RxDetect.Quiet state and informs the ExpressCard controller by deasserting the acknowledgement signal. Finally, the ExpressCard controller passes ownership to the PCIE controller by asserting the link enable signal (e.g. moving from USB3 mode to PCIE mode at block 76). The ExpressCard ownership may be changed to PCIE and the signaling rate may be changed, for example, to 2.5 GT/s. The interface may then operate in the PCIE mode (e.g. back at block 71).

In accordance with some embodiments of the invention, the state machine may provide no case where the switching can be done between PCIE and USB3 or vice versa without the appropriate interface state change, except possibly coming out of a system reset (which can be handled by appropriate power on/reset procedure to initialize the state machine). Downstream from the USB3 and/or PCIE controllers, internal buses may not operate according to the respective USB3/PCIE specifications. For example, some internal buses may include where the transaction layer is connected to and may follow some internal bus protocol.

Figure 8:
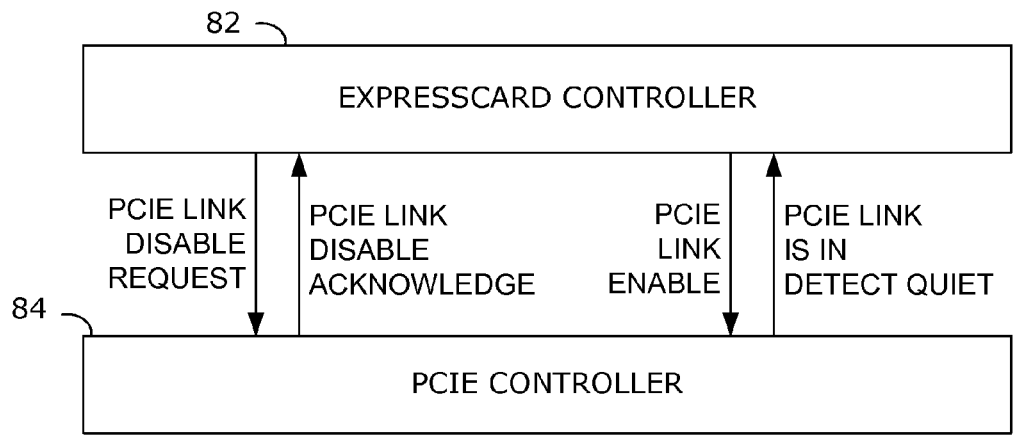
FIG. 8 is a block diagram of another bus controller in accordance with some embodiments of the invention.
Figure 9:
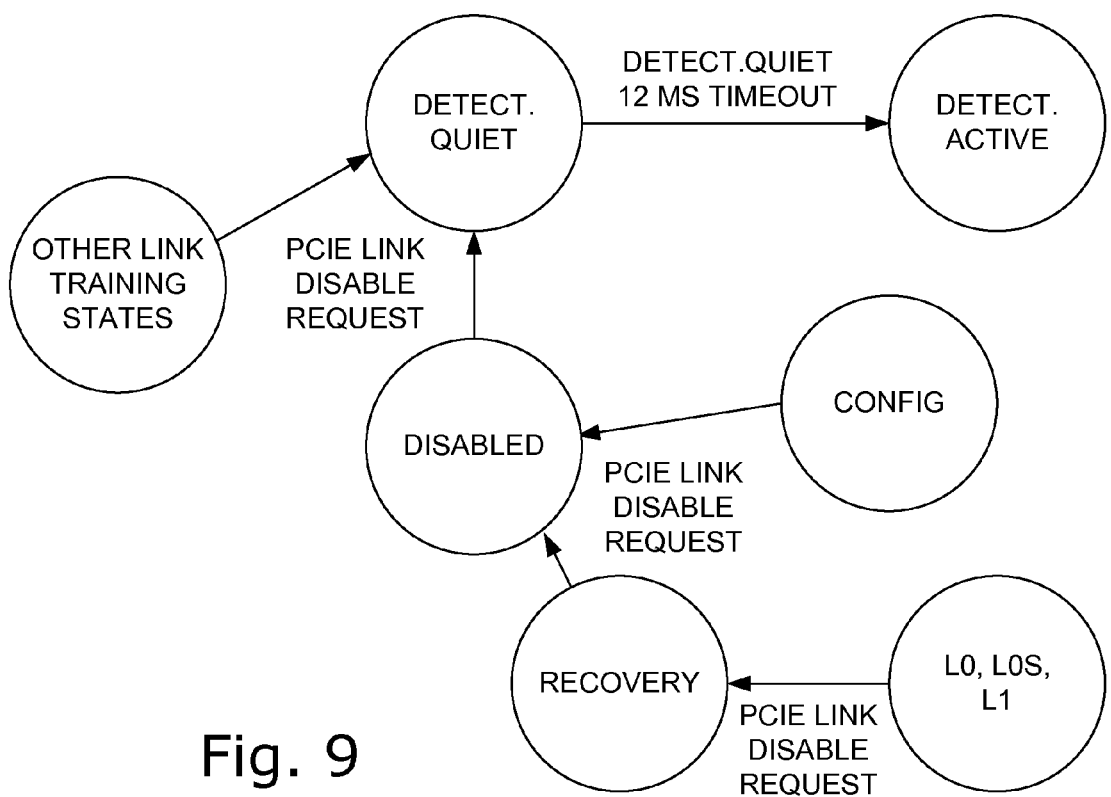
FIG. 9 is another flow diagram in accordance with some embodiments of the invention.

With reference to FIGS. 8 and 9, an example handshake between an EpxressCard Controller 82 and PCIE controller 84 is illustrated, with FIG. 9 detailing an example PCIE link disable flow. The PCIE link disable request may transition the present PCIE LTSSM state to the Detect.Quiet state directly, or, via Disabled state. The ExpressCard Strap controller may request for PCIE Link disable in the PCIE Configuration-.Linkwidthstart state or the Recovery.Idle state. The PCIE LTSSM will move to the Disabled state and then subsequently be directed to the Detect.Quiet state.

The ExpressCard Strap controller may also request for PCIE Link disable in the steady state L0 or lower power link states. The PCIE LTSSM will move to the Recovery state and then subsequently be directed to the Detect.Quiet state. The ExpressCard Strap controller may also request for PCIE Link disable in other link training states such as Polling or Configuration (other than Linkwidthstart). The PCIE LTSSM may transition directly to the Detect.Quiet state.

Figure 10:
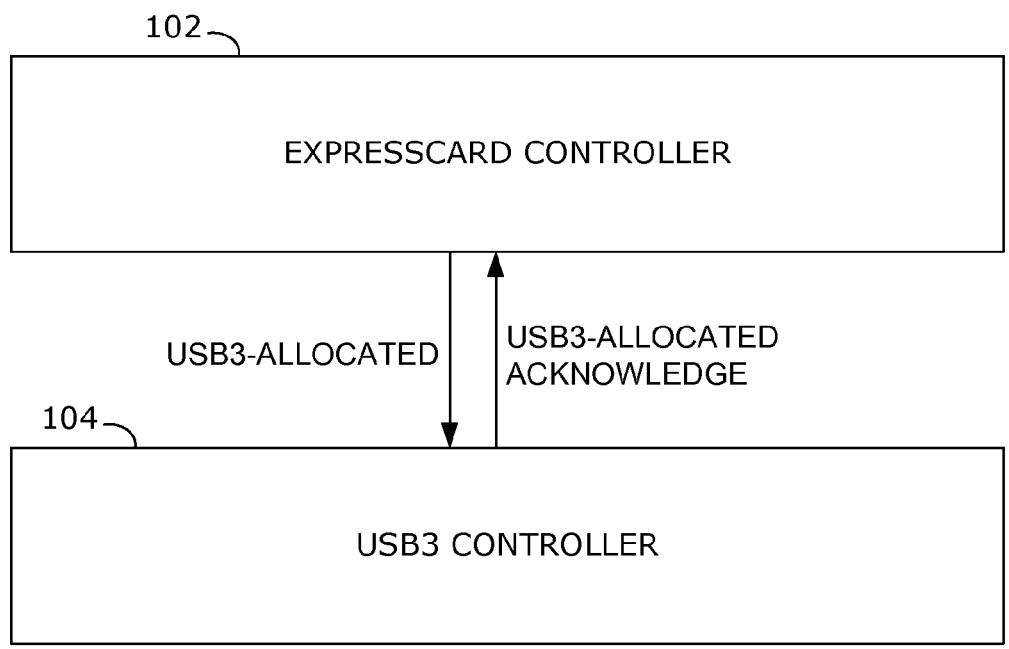
FIG. 10 is a block diagram of another bus controller in accordance with some embodiments of the invention.

With reference to FIG. 10, an example handshake between an ExpressCard controller 102 and a USB3 controller 104 is illustrated. The ExpressCard controller 102 may assert a USB3-allocated signal. The USB3 controller 104 may return a USB3-allocated acknowledge signal.

Advantageously, some embodiments of the invention may be integrated in a chipset platform and use an ExpressCard USB3# select pin strap for the dynamic switching between PCI Express and USB3 cards. For example, in accordance with some embodiments of the invention an ExpressCard Strap controller may monitor the USB3# select pin and interact with both the PCI Express and USB3 controllers. For example, the PCIE controller may release the ExpressCard ownership to USB3 via the PCIE Link Disable flow, which is fully compliant to the PCIE Base Specification 2.0. Advantageoulsy, some embodiments of the invention may provide support for both PCIE and USB3 ExpressCards through a single physical lane. For example, some embodiments of the invention may integrate the PCIE and USB3 controller sharing using the PHY Interface for the PCI Express and USB Architectures (PIPE) interface. Advantageously, some embodiments of the invention may provide a detection mechanism that allows and facilitates hot swapping (plug/removal) of PCIE and USB3 devices without requiring the platform to be powered down and/or without software intervention while swapping dynamically between PCIE and USB3.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A bus controller comprising:
    a first controller providing an interface to an external device;
    a second controller in communication with the first controller, the second controller providing an interface to an internal bus in accordance with a first bus standard; and
    a third controller in communication with the first controller, the third controller providing an interface to an internal bus in accordance with a second bus standard,
    wherein the first controller is to automatically switch ownership to the second controller in response to a determination that the external device communicates in accordance with the first bus standard when the external device is coupled with the first controller and is to automatically switch ownership to the third controller in response to a determination that the external device communicates in accordance with the second bus standard when the external device is coupled with the first controller.

2. The bus controller of claim 1, wherein the determination that the external device communicates in accordance with the first bus standard and the determination that the external device communicates in accordance with the second bus standard are to be made by one or more of a detection circuit and the first controller.

3. The bus controller of claim 1, wherein the determination that the external device communicates in accordance with the first bus standard and the determination that the external device communicates in accordance with the second bus standard are to be based on a binary value generated when the external device is coupled with the first controller.

4. The bus controller of claim 1, wherein the first controller is to automatically switch a signaling rate to maintain compliance to the respective first and second bus standards.

5. The bus controller of claim 2, wherein the first controller is to include a multiplexer to select between a signal from the second controller and the third controller, and wherein the detection circuit is to be coupled with a port for the external device and is to provide a selection signal to the multiplexer based on a signal from the port when the external device is coupled with the port.

6. The bus controller of claim 3, wherein the binary value is to be associated with a signal generated when the external device pulls an input pin.

7. The bus controller of claim 3, wherein the external device is to be determined to communicate in accordance with the first bus standard when the binary value is one value and the external device is to be determined to communicate in accordance with the second bus standard when the binary value is another value.

8. The bus controller of claim 4, wherein the signaling rate is to be switched before the first controller is to switch ownership.

9. A method comprising:
providing a first controller providing an interface to an external device;
providing a second controller in communication with the first controller, the second controller providing an interface to an internal bus in accordance with a first bus standard; and
providing a third controller in communication with the first controller, the third controller providing an interface to an internal bus in accordance with a second bus standard,
wherein the first controller automatically switches ownership to the second controller in response to a determination that the external device communicates in accordance with the first bus standard when the external device is coupled with the first controller and automatically switches ownership to the third controller in response to a determination that the external device communicates in accordance with the second bus standard when the external device is coupled with the first controller.

10. The method of claim 9, wherein the determination that the external device communicates in accordance with the first bus standard and the determination that the external device communicates in accordance with the second bus standard are made by one or more of a detection circuit and the first controller.

11. The method of claim 9, wherein the determination that the external device communicates in accordance with the first bus standard and the determination that the external device communicates in accordance with the second bus standard are based on a binary value generated when the external device is coupled with the first controller.

12. The method of claim 9, wherein the first controller automatically switches a signaling rate to maintain compliance to the respective first and second bus standards.

13. The method of claim 10, wherein the first controller includes a multiplexer selecting between a signal from the second controller and the third controller, and wherein the detection circuit is coupled with a port for the external device and provides a selection signal to the multiplexer based on a signal from the port when the external device is coupled with the port.

14. The method of claim 11, wherein the binary value is associated with a signal generated when the external device pulls an input pin.

15. The method of claim 11, wherein the external device is determined to communicate in accordance with the first bus standard when the binary value is one value and the external device is determined to communicate in accordance with the second bus standard when the binary value is another value.

16. The method of claim 12, wherein the signaling rate is switched before the first controller is to switch ownership.

17. A system comprising:
a processor;
a memory in communication with the processor;
a bus in communication with the processor;
a first controller providing an interface to an external device;
a second controller in communication with the first controller, the second controller providing an interface to the bus in accordance with a first bus standard; and
a third controller in communication with the first controller, the third controller providing an interface to the bus in accordance with a second bus standard,
wherein the first controller is to automatically switch ownership to the second controller in response to a determination that the external device communicates in accordance with the first bus standard when the external device is coupled with the first controller and is to automatically switch ownership to the third controller in response to a determination that the external device communicates in accordance with the second bus standard when the external device is coupled with the first controller.

18. The system of claim 17, wherein the first controller is to include a multiplexer to select between a signal from the second controller and the third controller, and wherein a detection circuit is to be coupled with a port for the external device and is to provide a selection signal to the multiplexer based on a signal from the port when the external device is coupled with the port.

19. The system of claim 17, wherein the determination that the external device communicates in accordance with the first bus standard and the determination that the external device communicates in accordance with the second bus standard are to be based on a binary value generated when the external device is coupled with the first controller.

20. The system of claim 17, wherein the first controller is to automatically switch a signaling rate to maintain compliance to the respective first and second bus standards.

* * * * *